United States Patent
ElKady et al.

(10) Patent No.: US 9,404,418 B2
(45) Date of Patent: Aug. 2, 2016

(54) LOW EMISSION TURBINE SYSTEM AND METHOD

(75) Inventors: Ahmed Mostafa ElKady, Niskayuna, NY (US); Andrei Tristan Evulet, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1157 days.

(21) Appl. No.: 11/863,582

(22) Filed: Sep. 28, 2007

(65) Prior Publication Data

US 2009/0218821 A1    Sep. 3, 2009

(51) Int. Cl.
*F02C 7/08* (2006.01)
*F02C 3/34* (2006.01)
*F01K 23/10* (2006.01)

(52) U.S. Cl.
CPC . *F02C 3/34* (2013.01); *F01K 23/10* (2013.01); *Y02E 20/14* (2013.01); *Y02E 20/18* (2013.01)

(58) Field of Classification Search
CPC ............ F02C 3/34; F02C 1/08; Y02E 20/16; Y02E 20/18; F01K 23/10
USPC ................... 60/39.12, 39.5, 39.52, 732, 733
See application file for complete search history.

(56) References Cited

U.S. PATENT DOCUMENTS

| | | | | |
|---|---|---|---|---|
| 4,426,842 A * | 1/1984 | Collet | ........................ | 60/39.511 |
| 4,667,829 A * | 5/1987 | Edmund-White | ............ | 206/575 |
| 4,984,429 A * | 1/1991 | Waslo et al. | ..................... | 60/752 |
| 5,300,265 A * | 4/1994 | Banks et al. | ................... | 422/172 |
| 5,794,431 A * | 8/1998 | Utamura et al. | ................ | 60/783 |
| 5,819,540 A * | 10/1998 | Massarani | ...................... | 60/732 |
| 5,950,417 A | 9/1999 | Robertson, Jr. et al. | | |
| 6,256,976 B1 | 7/2001 | Kataoka et al. | | |
| 6,286,298 B1 | 9/2001 | Burrus et al. | | |
| 6,287,111 B1 * | 9/2001 | Gensler | ........................ | 432/170 |
| 6,298,654 B1 * | 10/2001 | Vermes et al. | .................. | 60/774 |
| 6,796,130 B2 | 9/2004 | Little et al. | | |
| 6,832,485 B2 * | 12/2004 | Sugarmen et al. | .............. | 60/780 |
| 6,996,991 B2 | 2/2006 | Gadde et al. | | |
| 7,047,748 B2 * | 5/2006 | Zauderer | ......................... | 60/775 |
| 7,127,899 B2 | 10/2006 | Sprouse et al. | | |
| 7,328,581 B2 * | 2/2008 | Christensen et al. | ........... | 60/783 |
| 2004/0123601 A1 * | 7/2004 | Fan | ................................ | 60/781 |
| 2004/0244381 A1 * | 12/2004 | Becker | ............................ | 60/772 |
| 2007/0125093 A1 | 6/2007 | Burd et al. | | |
| 2007/0254966 A1 * | 11/2007 | Eskin et al. | ................... | 518/702 |

FOREIGN PATENT DOCUMENTS

| | | |
|---|---|---|
| JP | 1082306 A | 3/1998 |
| JP | 1172027 A | 3/1999 |
| JP | 2000193244 A | 7/2000 |

OTHER PUBLICATIONS

Unofficial English translation of Office Action issued in connection with corresponding JP Application No. 2008-243474 on Oct. 22, 2013.

* cited by examiner

*Primary Examiner* — Gerald L Sung
(74) *Attorney, Agent, or Firm* — Francis T. Coppa

(57) ABSTRACT

A turbine system is provided. The turbine system includes a compressor configured to compress ambient air and a combustor configured to receive compressed air from the compressor, and to combust a fuel stream to generate an exhaust gas. The turbine system also includes a turbine for receiving the exhaust gas from the combustor to generate electricity; wherein a first portion of the exhaust gas is mixed with the ambient air to form a low-oxygen air stream, and wherein the low-oxygen air stream is compressed using the compressor, and is directed to the combustor for combusting the fuel stream to generate a low-$NO_x$ exhaust gas.

18 Claims, 7 Drawing Sheets

LOW EMISSION TURBINE SYSTEM AND METHOD

BACKGROUND

The invention relates generally to turbine systems, and more particularly to, low emission turbine systems and methods.

Various types of gas turbine systems are known and are in use. For example, aeroderivative gas turbines are employed for applications such as power generation, marine propulsion, gas compression, cogeneration, offshore platform power and so forth. Typically, the gas turbines include a compressor for compressing an air flow and a combustor that combines the compressed air with fuel and ignites the mixture to generate an exhaust gas. Further, the exhaust gas is expanded through a turbine for power generation.

Typically, the combustors for such systems are designed to minimize emissions such as $NO_x$ and carbon monoxide (CO) emissions. In certain traditional systems, lean premixed combustion technology is employed to reduce the emissions from such systems. Typically, $NO_x$ emissions are controlled by reducing the flame temperature in the reaction zone of the combustor. In operation, low flame temperature is achieved by premixing fuel and air prior to combustion. Further, certain gas turbine systems are utilized using high levels of airflow, thereby resulting in lean fuel mixtures with a flame temperature that is low enough to reduce the formation of $NO_x$. However, because lean flames have a low flame temperature, they result in high CO emissions. Further, the window of operability becomes very small for such combustors and the combustors are required to be operated away from the lean blow out limit. As a result, it is difficult to operate the premixers employed in the combustors outside of their design space.

Moreover, when sufficiently lean flames are subjected to power setting changes, flow disturbances, or variations in fuel composition, the resulting equivalence ratio perturbations may cause loss of combustion. Such a blowout may cause loss of power and expensive down times in stationary turbines.

Certain other systems employ post combustion control techniques to control the emissions. For example, selective catalytic reduction (SCR) techniques may be utilized as an add-on $NO_x$ control measure. In an SCR process, a gaseous or liquid reductant such as ammonia may be directly injected into the exhaust gas from the turbine, which is then passed over a catalyst to react with $NO_x$. The reductant converts the $NO_x$ in the exhaust gas to nitrogen and water. However, incorporation of additional components, such as a catalytic reactor for the SCR process, is a challenge, due to costs and the added complexity of such systems.

Accordingly, there is a need for a turbine system that has reduced emissions. Furthermore, it would be desirable to provide combustion technologies that enhance the overall efficiency of the turbine system without correspondingly increasing thermal NOx formation.

BRIEF DESCRIPTION

Briefly, according to one embodiment, a turbine system is provided. The turbine system includes a compressor configured to compress ambient air and a combustor configured to receive compressed air from the compressor and to combust a fuel stream to generate an exhaust gas. The turbine system also includes a turbine for receiving the exhaust gas from the combustor to generate electricity; wherein a first portion of the exhaust gas is mixed with the ambient air to form a low-oxygen air stream, and wherein the low-oxygen air stream is compressed, using the compressor, and is directed to the combustor for combusting the fuel stream to generate a low-$NO_x$ exhaust gas.

Another embodiment also includes a turbine system. The turbine system includes a compressor configured to compress ambient air and at least a portion of an exhaust gas to form a compressed low-oxygen air stream. The turbine system also includes a combustor configured to receive the compressed low-oxygen air stream from the compressor, and to combust a fuel stream in a rich-quench-lean (RQL) mode of combustion, to generate the exhaust gas. The turbine system also includes a turbine for receiving the exhaust gas from the combustor to generate electricity and a low-$NO_x$ exhaust gas, wherein a first portion of the exhaust gas is recirculated to the compressor to form the low-oxygen air stream.

In another embodiment, an integrated coal gasification combined cycle (IGCC) system is provided. The IGCC system includes a gasifier configured to produce a syngas fuel from coal, and a turbine system coupled to the gasifier. The turbine system includes a compressor configured to compress ambient air and at least a portion of an exhaust gas to form a compressed low-oxygen air stream. The system further includes a combustor configured to receive the compressed low-oxygen air stream from the compressor, and to combust the syngas fuel in a rich-quench-lean (RQL) mode of combustion, to generate the exhaust gas. The turbine system also includes a turbine for receiving the exhaust gas from the combustor to generate electricity and a low-NOx exhaust gas, wherein a first portion of the exhaust gas is recirculated to the compressor to form the low-oxygen air stream.

In another embodiment, a method of operating a turbine system is provided. The method includes producing a compressed air stream, combusting the compressed air stream with a fuel stream to form an exhaust gas, and expanding the exhaust gas to generate electricity. The method also includes compressing and mixing a first portion of the exhaust gas with an air stream to form a low-oxygen air stream, and combusting the low-oxygen air stream with the fuel stream to generate a low-NOx exhaust gas.

In another embodiment, a method of reducing emissions from a turbine system is provided. The method includes compressing an air stream and at least a portion of an exhaust gas to produce a low-oxygen air stream, and combusting the low-oxygen air stream with a fuel stream in a rich-quench-lean mode to generate a low-NOx exhaust gas. The method also includes expanding the exhaust gas to generate electricity.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to reduce emissions in turbine systems, and to provide combustion technologies to enhance overall efficiency of the turbine systems, while reducing NOx formation. In some of the specific embodiments, the present technique includes employing exhaust gas recirculation (EGR), along with a rich-quench-lean (RQL) mode of combustion to minimize emissions such as $NO_x$.

Figure 1:
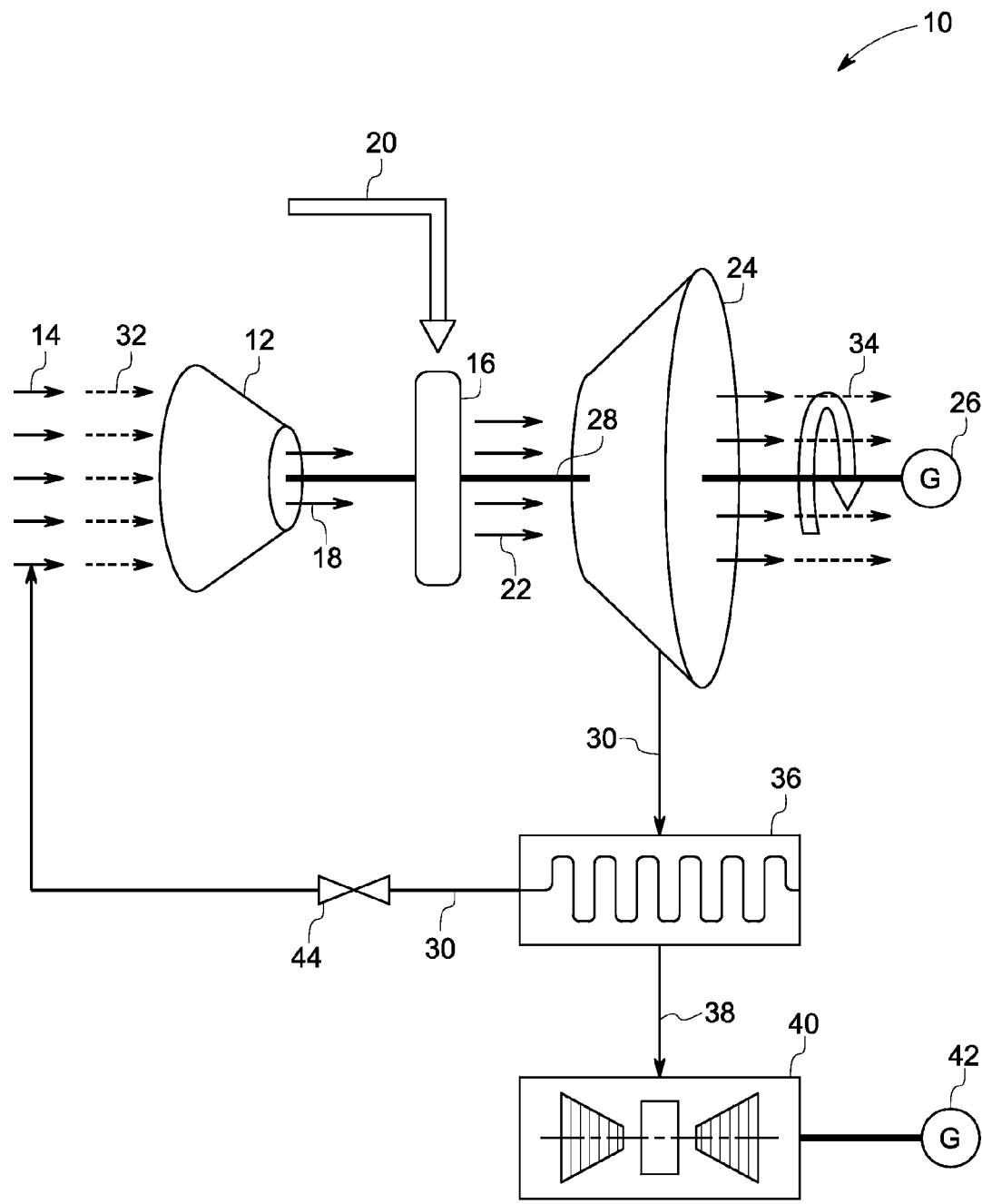
FIG. 1 is a diagrammatical illustration of an exemplary turbine system in accordance with aspects of the present technique.

Turning now to the drawings and referring first to FIG. 1 a turbine system 10 is illustrated. The turbine system 10 includes a compressor 12 configured to compress ambient air 14. Further, the turbine system 10 includes a combustor 16 that is in flow communication with the compressor 12. The combustor 16 is configured to receive compressed air 18 from the compressor 12, and to combust a fuel stream 20 to generate an exhaust gas 22. In one exemplary embodiment, the combustor 16 includes a Dry Low Emission (DLE) or a Dry Low NOx (DLN) combustor. In addition, the turbine system 10 includes a first turbine 24 located downstream of the combustor 16. The turbine 24 is configured to expand the exhaust gas 22, to drive an external load such as a generator 26 to generate electricity. In the illustrated embodiment, the compressor 12 is driven by the power generated by the turbine 24 via a shaft 28.

In this exemplary embodiment, a first portion 30 of the exhaust gas 22 is mixed with the ambient air 14 to form a low-oxygen air stream 32. In certain embodiments, the first portion 30 includes about 35% to about 50% of the exhaust gas generated from the turbine 24. In one exemplary embodiment, the low-oxygen air stream contains less than about 13% volume of oxygen. Further, the low-oxygen air and exhaust gas mixture henceforth referred to as low-oxygen air stream 32 is compressed using the compressor 12 and is directed to the combustor 16 for combusting the fuel stream 20 to generate a low-NOx exhaust gas 34. In particular, combustion of the fuel stream 20 with the low-oxygen air stream 32 facilitates reduction in flame temperature thereby resulting in $NO_x$ reduction. In addition, combustion of the fuel stream 20 with the low-oxygen air stream 32 enables fuel-rich combustion leading to further $NO_x$ reduction.

As used herein, the term "fuel-rich combustion" refers to combustion of the fuel stream 20 and the air 32, wherein an equivalence ratio or a fuel-to-oxidizer ratio is greater than about 1. In one exemplary embodiment, the low-$NO_x$ exhaust gas stream 34 contains a $NO_x$ level of less than about 30 ppm. In certain embodiments, the low-$NO_x$ exhaust gas stream 34 contains a $NO_x$ level of less than about 5 ppm.

In this embodiment, the turbine system 10 includes a heat recovery steam generator (HRSG) 36, configured to receive the exhaust gas 30 from the turbine 24 for generation of steam 38. Further, the turbine system 10 includes a second turbine such as a steam turbine 40 to generate additional electricity via a generator 42, using the steam 38 from the HRSG 36. In the illustrated embodiment, the turbine system 10 includes an EGR valve 44 to control a flow of the first portion 30 of the exhaust gas from the HRSG 36 to the compressor 12. Further, the low-oxygen air stream 32 is combusted with the fuel stream 20 in a RQL mode of combustion within the combustor 16. The RQL mode of combustion will be described in detail below with reference to FIGS. 4 and 5.

Figure 2:
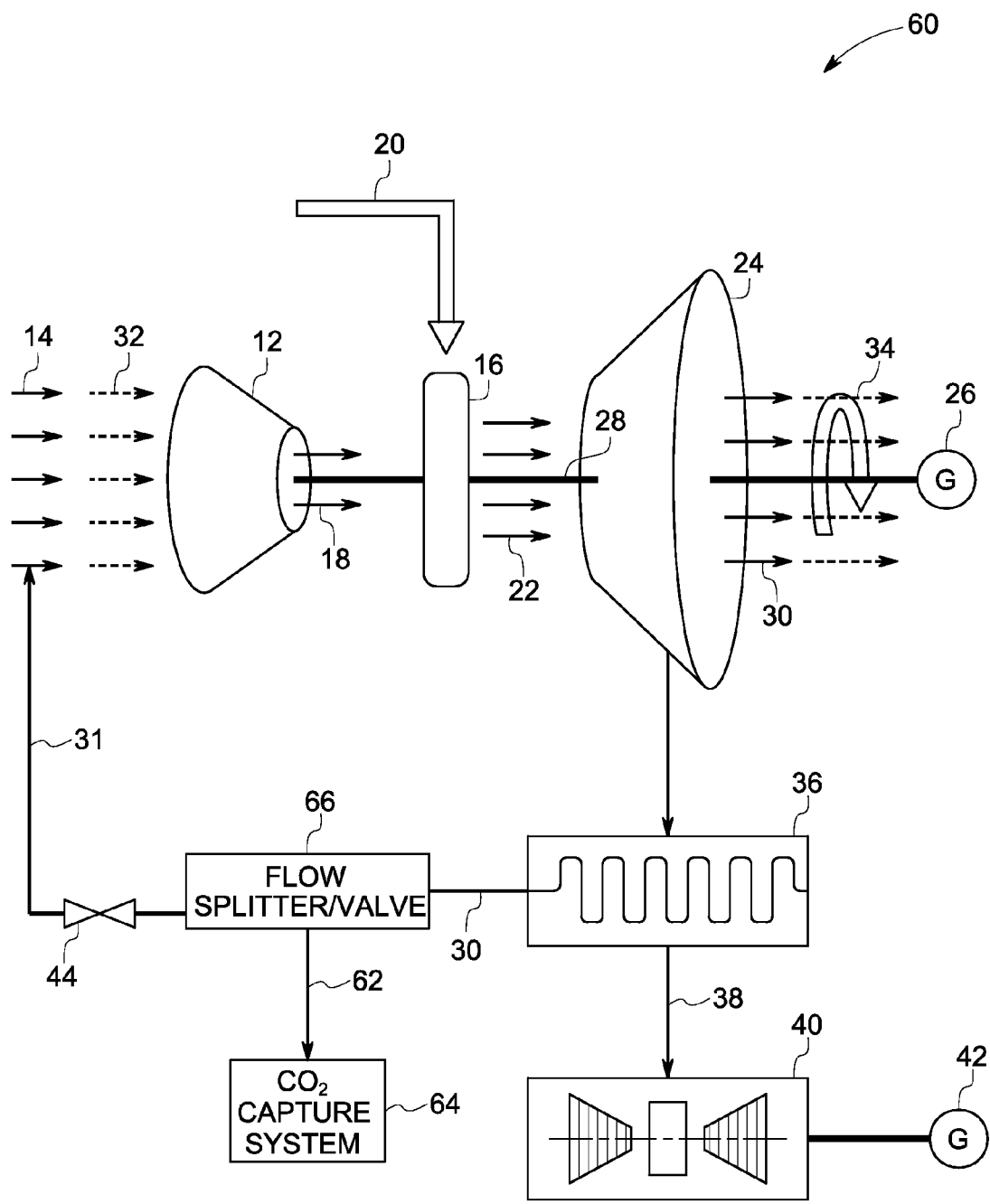
FIG. 2 is a diagrammatical illustration of another exemplary turbine system in accordance with aspects of the present technique.

FIG. 2 is a diagrammatical illustration of another exemplary turbine system 60 in accordance with aspects of the present technique. As discussed with reference to FIG. 1, a first portion 31 of the exhaust gas 30 from the HRSG 36 is mixed with the ambient air 14 to form the low-oxygen air stream 32. Subsequently, the low-oxygen air stream 32 is compressed using the compressor 12, and is directed to the combustor 16 for combusting the fuel stream 20 to generate a low-NOx exhaust gas 34. In this exemplary embodiment, a second portion 62 of the exhaust gas from the HRSG 36 is directed to a carbon dioxide capture system 64. It should be noted that the first portion 30 of the exhaust gas contains carbon dioxide. Thus, when portion 30 is mixed with ambient air 14 and combusted in the combustor 16, the overall carbon dioxide concentration at the carbon dioxide capture system 64 is increased. It should be noted that identical reference numerals are sometimes being used to show a gas at different stages in the process. A flow splitter 66 may be employed to split the first and second portions 30 and 62 from the HRSG.

Figure 3:
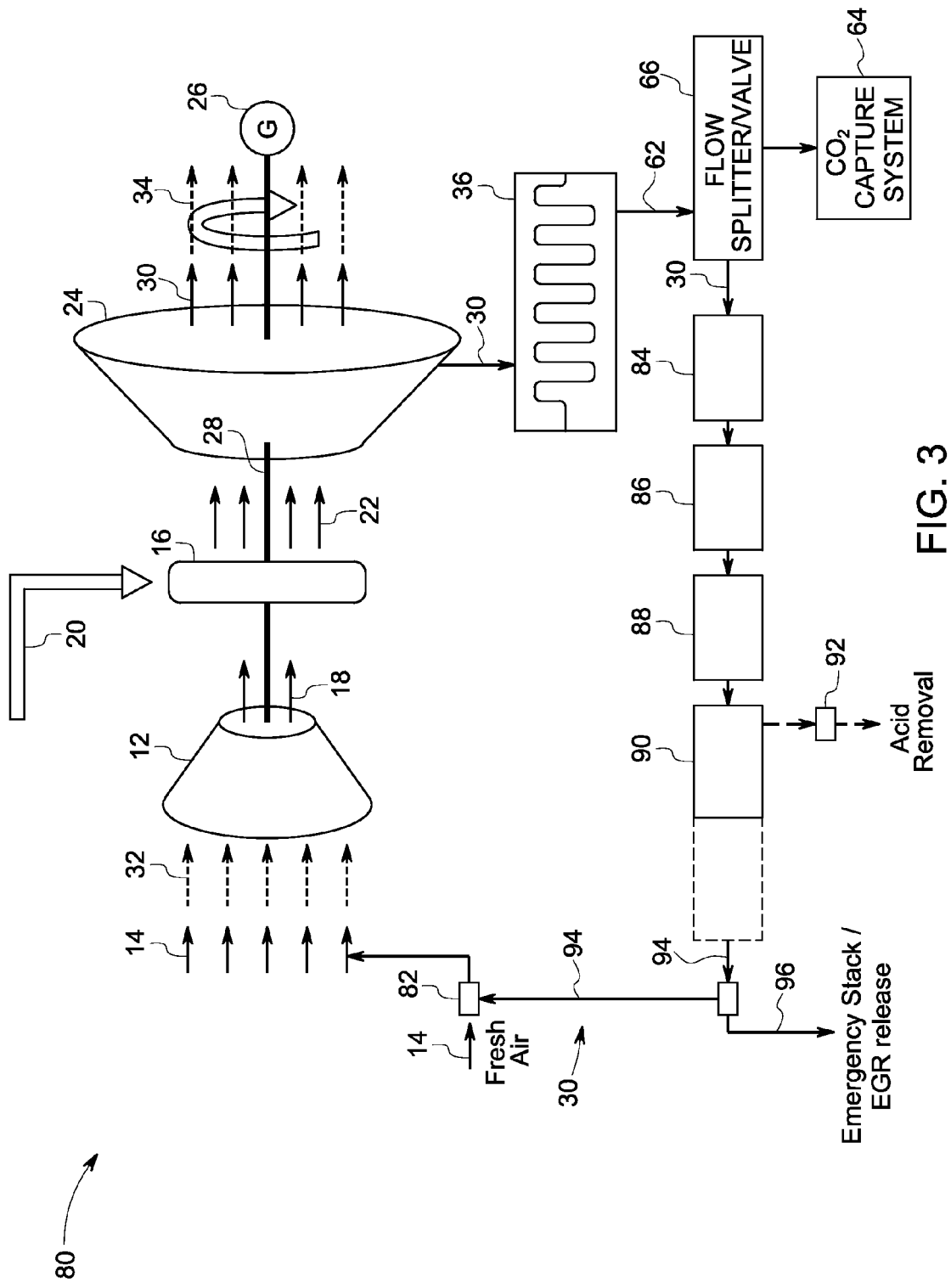
FIG. 3 is a diagrammatical illustration of an exemplary configuration of the turbine systems of FIG. 2 in accordance with aspects of the present technique.

FIG. 3 is a diagrammatical illustration of an exemplary configuration 80 of the turbine system 60 of FIG. 2. As discussed with reference to FIGS. 1 and 2, the first portion 30 of the exhaust gas from the HRSG 36 is mixed with the ambient air 14, using a mixer 82, to form the low-oxygen stream 32. Further, the second portion 62 of the exhaust gas from the HRSG 36 is directed to the carbon dioxide capture system 64. In certain embodiments, the first portion 30 of the exhaust gas may be conditioned before mixing with the ambient air 14 to form the low-oxygen air stream 32. In particular, the first portion 30 of the exhaust gas may be cooled, scrubbed and dried by extracting condensed water before mixing it with the ambient air 14.

In operation, the exhaust gas 30 from the turbine 24 is directed to the HRSG 36. The first portion 30 of the exhaust gas may be directed to a fan 84 and then directed to a water quenching system 86. Further, the exhaust gas 30 may be passed through a decontamination element 88 for removing contaminants from the gas. The decontaminated exhaust gas 30 may be then directed to a cooler/condenser 90 before introduction of the gas to the compressor 12. In certain embodiments, a condensate cleanup unit 92 may be employed for acid removal from the exhaust gas 30. Further, conditioned exhaust gas 94 may be then mixed with the ambient air 14 to form the low-oxygen stream 32. In certain embodiments, a portion 96 of the conditioned exhaust gas 94 may be directed to an emergency stack.

Figure 4:
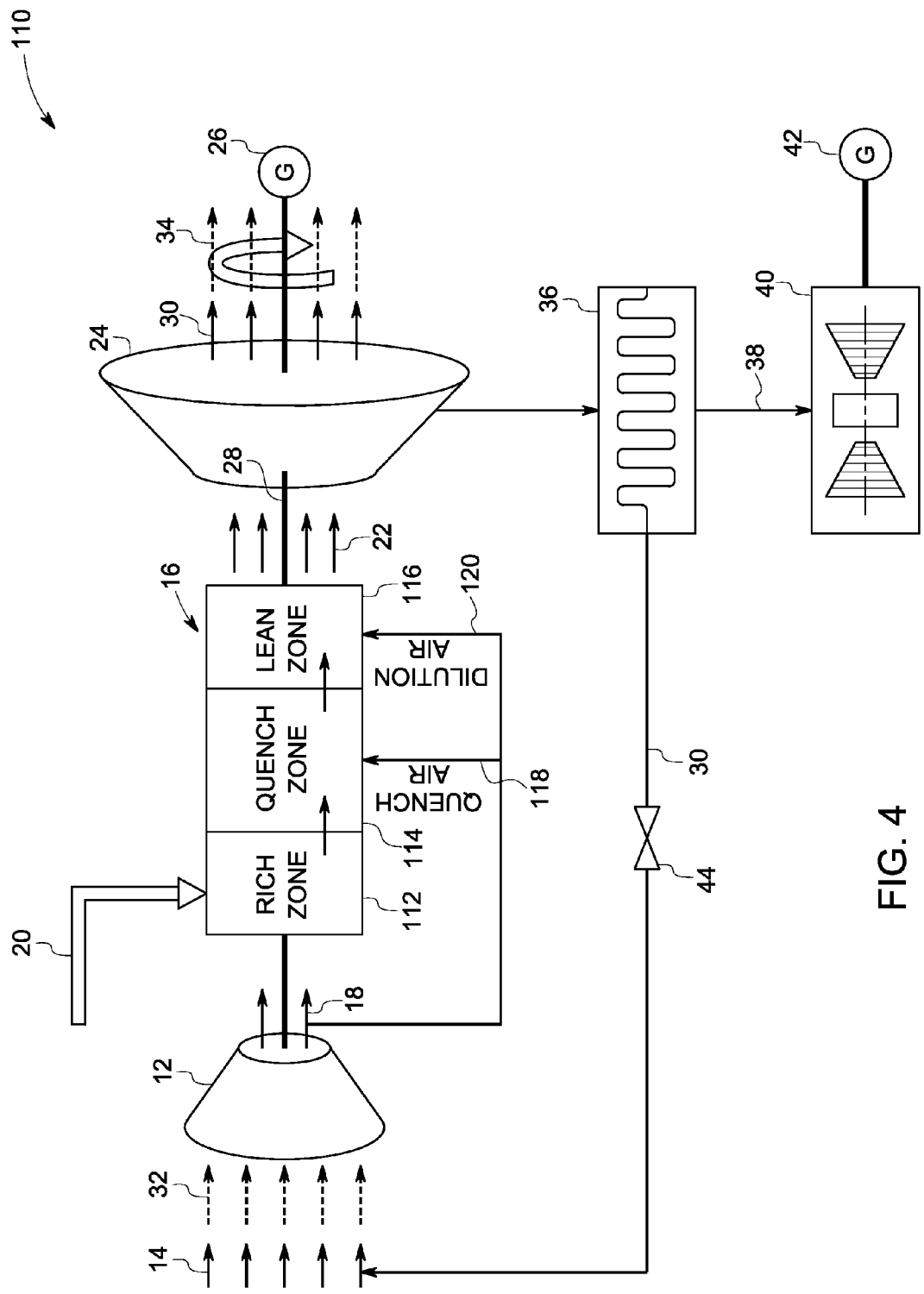
FIG. 4 is a diagrammatical illustration of an exemplary configuration of the turbine systems of FIGS. 1-3 having an RQL mode of combustion in accordance with aspects of the present technique.

As discussed above, the low-oxygen air stream 32 is combusted with the fuel stream 20 in a RQL mode of combustion within the combustor 16. FIG. 4 is a diagrammatical illustration of an exemplary configuration 110 of the turbine systems of FIGS. 1-3 having the RQL mode of combustion. In this exemplary embodiment, the combustor 16 includes a rich zone 112 configured to allow fuel-rich combustion of the fuel stream 20, and a quench zone 114 configured to allow conversion of the fuel-rich combustion to a fuel-lean combustion of the fuel stream 20.

As used herein, the term "fuel-lean combustion" refers to combustion of the fuel stream 20 and the air 32, wherein an equivalence ratio or a fuel to oxidizer ratio is less than about 1. Further, the combustor 16 includes a lean zone 116 configured to allow the fuel-lean combustion of the fuel stream 20. In certain embodiments, about 60% to about 90% of the low-oxygen air stream 32 is mixed with the fuel stream 20, and is introduced into the rich zone 112, to facilitate the fuel-rich combustion of the fuel stream 20.

In operation, the low-oxygen stream 32 is combusted in the rich zone 112 to allow fuel-rich combustion that facilitates combustion under oxygen-deprived conditions, thereby leading to reduction in NOx formation. In particular, incomplete combustion under fuel-rich conditions in the rich zone 112 produces an atmosphere with a high concentration of carbon monoxide (CO) and uncombusted hydrocarbons. Furthermore, the presence of oxygen in the rich zone 112 is minimized. As a result, nitrogen conversion to $NO_x$ is minimized. Further, lower peak temperatures due to partial combustion also reduce the formation of thermal $NO_x$.

Further, the partially burned combustion gases from the rich zone 112 then undergo dilution in the quench zone 114. In certain embodiments, quench air 118 from the compressor 12 may be introduced into the quench zone 114 for the dilution of the partially burned combustion gases. Further, in certain embodiments, dilution air 120 may be introduced into the lean zone 116 to facilitate fuel-lean combustion of the fuel stream 20.

Figure 5:
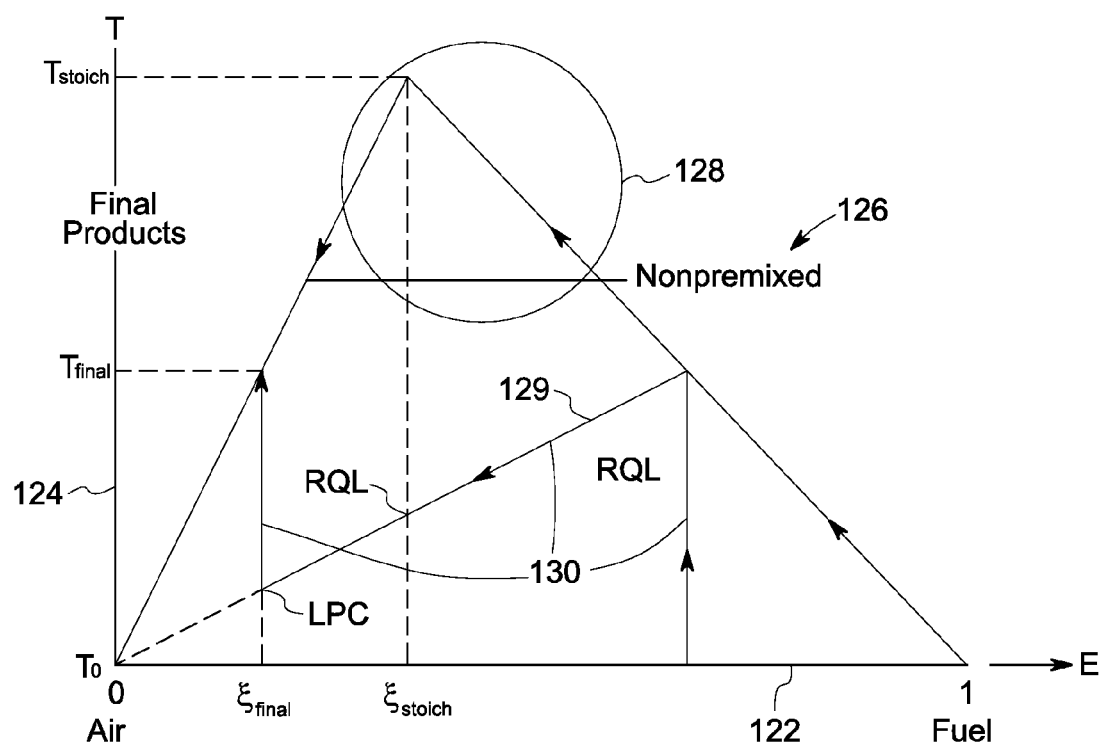
FIG. 5 is a graphical representation of mixing and reaction of fuel and air in different modes of combustion.

FIG. 5 is a qualitative graphical representation of mixing and reaction of fuel and air in different modes of combustion. The abscissa axis 122 represents an equivalence ratio ($\xi$) indicative of the fuel mixing with air. In this exemplary embodiment, numerals such as 0 and 1 indicated on the axis 122 represent the mass fraction of the fuel in the air. The ordinate axis 124 represents a temperature indicative of the chemical reaction in various modes of combustion. As illustrated, in non-premixed mode of combustion 126, the reacting flow evolves through an equivalence ratio $\xi$ of about 1.0 and having an initial temperature of $T_0$. Further, the reacting flow attains a maximum temperature $T=T_{stoic}$ at an equivalence ratio $\xi=\xi_{stoic}$ to the final composition $\xi=\xi_{final}$ and temperature $T=T_{final}$. In this embodiment, zone 128 near the maximum temperature $T_{stoic}$ represents the region where NO generation is largest. In the RQL mode of combustion, generally represented by reference numeral 130, rich products are rapidly mixed with air (as represented by mixing curve 129) with the goal of reacting to achieve $\xi=\xi_{final}$, $T=T_{final}$. It should be noted that the flame temperature would be reduced in the fuel-rich mode of combustion, resulting in reduced $NO_x$ formation. Further, in the fuel-lean mode of combustion, the combustion is completed using additional oxidizer, and to burnout CO to $CO_2$, thereby increasing the combustor exit temperature to a desired level, $T_{final}$.

Figure 6:
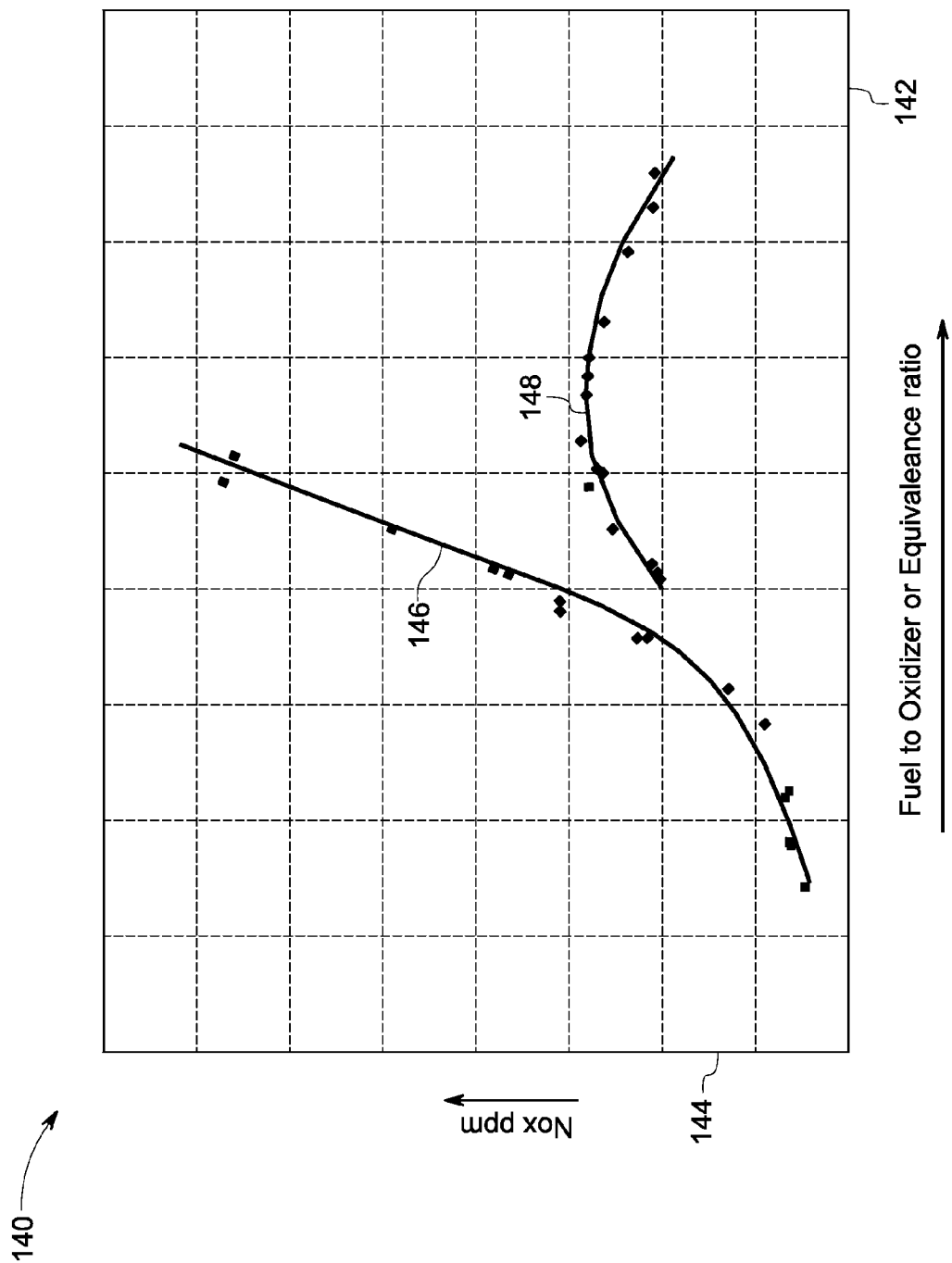
FIG. 6 is a graphical representation of exemplary results for $NO_x$ generated from turbine systems, with and without employing the EGR and RQL techniques.

Advantageously, the technique of exhaust gas recirculation in combination with the RQL combustion enables substantial reduction in $NO_x$ formation. FIG. 6 is a graphical representation of exemplary results 140 for $NO_x$ generated from turbine systems, with and without employing the EGR and RQL techniques described above. The abscissa axis 142 represents the fuel to oxidizer ratio, or an equivalence ratio, and the ordinate axis 144 represents the NOx levels measured in ppm generated from the turbine systems. The results from the turbine system without employing the EGR and RQL concepts are represented by profile 146. Further, results from the turbine system with the EGR and RQL techniques described above are represented by profile 148. In this exemplary embodiment, the profile 148 represents the results for NOx formation for a turbine system having about 45% of EGR, where the oxygen concentration is reduced to about 14.8%.

As can be seen, the $NO_x$ levels from the turbine system with the EGR and RQL combustion are substantially less than the $NO_x$ levels from the turbine system without employing the EGR and RQL combustion, beyond a certain equivalence ratio of interest.

Figure 7:
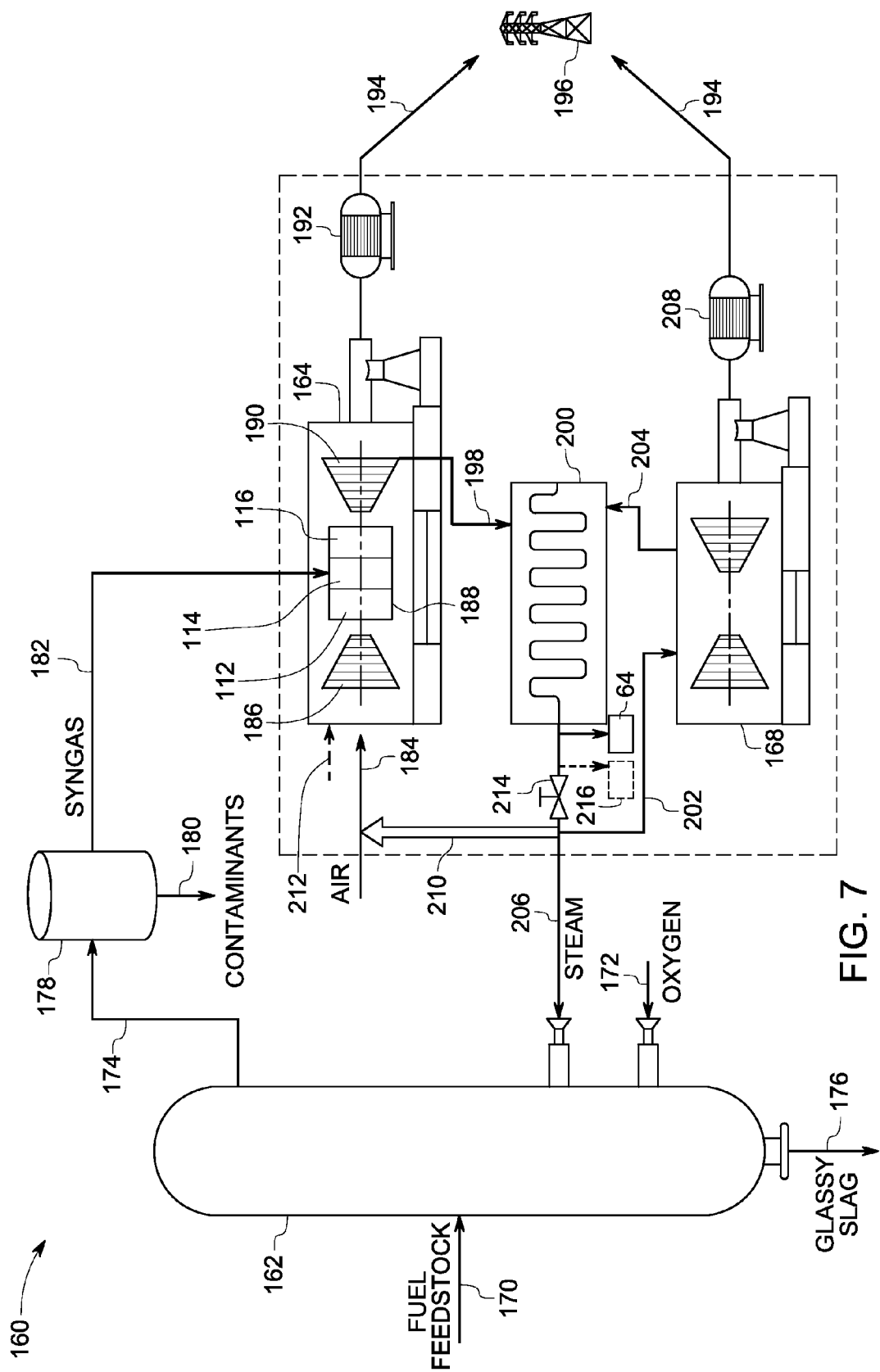
FIG. 7 is a diagrammatical illustration of an integrated coal gasification combined cycle (IGCC) system in accordance with aspects of the present technique.

FIG. 7 is a diagrammatical illustration of an integrated coal gasification combined cycle (IGCC) system 160 in accordance with aspects of the present technique. The IGCC system 160 includes a gasifier 162 and a turbine system 164 coupled to the gasifier 162. In addition, the IGCC system 160 includes a steam turbine 168 coupled to the turbine system 164, and configured to generate electrical energy by utilizing heat from exhaust gases from the turbine system 164.

In operation, the gasifier 162 receives a fuel feedstock 170 along with oxygen 172 that is typically produced in an on-site air separation unit (not shown). In the illustrated embodiment, the fuel feedstock 170 includes coal. In other embodiments, the fuel feedstock 170 can include any Low Value Fuel (LVF). Examples include coal, biomass, waste, oil sands, municipal waste, coke and the like. The fuel feedstock 170 and oxygen 172 are reacted in the gasifier 162 to produce synthesis gas (syngas) 174 that is enriched with carbon monoxide (CO) and hydrogen ($H_2$). Further, feedstock minerals are converted into a slag product 176 that may be utilized in roadbeds, landfill cover and other applications.

The syngas 174 generated by the gasifier 162 is directed to a gas cooling and cleaning unit 178 where the syngas 174 is cooled and contaminants 180 are removed to generate purified syngas 182. In the illustrated embodiment, the contaminants 180 include, for example, sulfur, mercury, or carbon dioxide. Further, the purified syngas 182 is combusted in the turbine system 164 to produce electrical energy. In this exemplary embodiment, an incoming flow of air 184 is compressed via a compressor 186, and the compressed air is directed to a combustor 188 for combusting the syngas 182 from the gasifier 162. Further, the combustor gas stream from the combustor 188 is expanded through a turbine 190 to drive a generator 192 for generating electrical energy 194 that may be directed to a power grid 196 for further use.

In the illustrated embodiment, exhaust gases 198 from the turbine system 164 are directed to a heat recovery steam generator (HRSG) 200 and are utilized to boil water to create steam 202 for the steam turbine 168. Further, in certain embodiments, heat 204 from the steam turbine 168 may be coupled to the HRSG 200 for enhancing efficiency of the HRSG 200. In addition, a portion of steam 206 from the HRSG 200 may be introduced into the gasifier 162 to control the H2:CO ratio of the generated syngas 174 from the gasifier 162. The steam turbine 168 drives a generator 208 for generating electrical energy 194 that is again directed to the power grid 196 for further use.

In the illustrated embodiment, a portion 210 of the exhaust gas 198 is mixed with the ambient air 184 to form a low-oxygen air stream 212. In this exemplary embodiment, the low-oxygen air stream has less than about 12% of oxygen. Further, the low-oxygen air stream 212 is compressed using the compressor 186. The compressed low-oxygen air stream 212 is then combusted with the syngas fuel 182 in RQL mode of combustion as described above with reference to FIGS. 4-5 to generate a low-$NO_x$ exhaust gas. In certain embodiments, the low-$NO_x$ exhaust gas has a NOx level of less than about 30 ppm. An EGR valve 214 may be employed to control the flow of the exhaust gas 210 to the compressor 186. Further, as described above, the combustor 164 may include the rich, quench and lean zones 112, 114 and 116 respectively (see FIG. 4) to facilitate the RQL mode of combustion. In addition, as described with reference to FIG. 2 a second portion 62 of the exhaust gas may be directed to a carbon dioxide capture system 64. Further, in certain embodiments, the exhaust gas 210 may be directed to an emergency stack 216.

The various aspects of the method described hereinabove have utility in different applications such as carbon capture and sequestration plants, low emissions gas turbines and IGCC systems. As noted above, the technique employs exhaust gas recirculation and RQL mode of combustion for substantially reducing NOx formation from such systems. Advantageously, the technique enhances the overall efficiency of the turbine system and carbon capture and sequestration plants, without correspondingly increasing thermal NOx formation. Further, the technique eliminates the need for additional components, such as a catalytic reactor for reducing $NO_x$ levels in existing turbine systems, thereby reducing the cost of such systems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A turbine system, comprising:
a compressor configured to compress ambient air;
a combustor configured to receive compressed air from the compressor and to combust a fuel stream in a rich-quench-lean (RQL) mode of combustion to generate an exhaust gas, wherein the combustor comprises:
a rich zone configured to allow fuel-rich combustion of the fuel stream;
a quench zone configured to allow conversion of the fuel-rich combustion to a fuel-lean combustion of the fuel stream; and
a lean zone configured to allow the fuel-lean combustion of the fuel stream;
a turbine for receiving the exhaust gas from the combustor to generate electricity and a low-$NO_x$ exhaust gas;
a heat recovery steam generator (HRSG) configured to receive the turbine exhaust gas for generation of steam;
a carbon dioxide capture system configured to capture a first portion of the turbine exhaust gas from the HRSG; and
an exhaust gas recirculation (EGR) control valve positioned directly downstream of the HRSG, and configured to solely control a flow of a second portion of turbine exhaust gas from the HRSG to the compressor subsequent to carbon dioxide capture via the carbon dioxide capture system,
wherein the second portion of the turbine exhaust gas subsequent to carbon dioxide capture is controllably mixed via the EGR control valve with the ambient air to form a low-oxygen air stream, and wherein the low-oxygen air stream is compressed using the compressor, and is directed to the combustor for combusting the fuel stream to generate a low-$NO_x$ combustor exhaust gas.

2. The turbine system of claim 1, further comprising a steam turbine configured to generate additional electricity using the steam from the heat recovery steam generator.

3. The turbine system of claim 1, wherein the low-oxygen stream contains less than 13% by volume of oxygen.

4. The turbine system of claim 1, wherein the low-$NO_x$ exhaust gas contains a $NO_x$ level of less than 30 ppm.

5. The turbine system of claim 4, wherein the low-$NO_x$ exhaust gas contains a $NO_x$ level of less than 5 ppm.

6. The turbine system of claim 1, wherein the first portion of the exhaust gas comprises 35% to 50% of the exhaust gas generated by the turbine.

7. The turbine system of claim 1, wherein the combustor comprises a Dry Low Emission (DLE) or a Dry low NOx (DLN) combustor.

8. The turbine system of claim 1, configured to combine 60% to 90% of the low-oxygen air stream with the fuel stream, for introduction into the rich zone to facilitate the fuel-rich combustion.

9. A turbine system, comprising:
a compressor configured to compress ambient air and at least a portion of an exhaust gas recirculated from a turbine to form a compressed low-oxygen air stream;
a combustor configured to receive the compressed low-oxygen air stream from the compressor, and to combust a fuel stream in a rich-quench-lean (RQL) mode of combustion to generate an exhaust gas, wherein the combustor comprises:
a rich zone configured to allow fuel-rich combustion of the fuel stream;
a quench zone configured to allow conversion of the fuel-rich combustion to a fuel-lean combustion of the fuel stream; and
a lean zone configured to allow the fuel-lean combustion of the fuel stream;
the turbine for receiving the exhaust gas from the combustor to generate electricity and a low-$NO_x$ exhaust gas; wherein a first portion of the low-$NO_x$ turbine exhaust gas is recirculated to the compressor to form the low-oxygen air stream;
a heat recovery steam generator (HRSG) configured to receive the first portion of the exhaust gas from the turbine prior to recirculation of the first portion of turbine exhaust gas to the compressor; and
an exhaust gas recirculation (EGR) control valve positioned directly downstream of the HRSG, and configured to solely control a flow of the first portion of exhaust gas from the heat recovery steam generator to the compressor,
wherein a second portion of the exhaust gas from the heat recovery steam generator is directed to a carbon dioxide capture system to capture carbon dioxide from the turbine exhaust gas prior to recirculation of the first portion of the turbine exhaust gas to the compressor via the EGR valve.

10. The turbine system of claim 9, further comprising a steam turbine configured to generate additional electricity using steam from the heat recovery steam generator.

11. The turbine system of claim 9, wherein the low-oxygen stream has less than 13% by volume of oxygen.

12. The turbine system of claim 9, wherein the low-$NO_x$ exhaust gas has a $NO_x$ level of less than 30 ppm.

13. The turbine system of claim 9, wherein the first portion of the exhaust gas comprises 35% to 50% of the exhaust gas generated from the turbine.

14. The turbine system of claim 9, wherein the combustor comprises a Dry Low Emission (DLE) combustor.

15. An integrated coal gasification combined cycle (IGCC) system, comprising:
a gasifier configured to produce a syngas fuel from coal; and
a turbine system coupled to the gasifier and comprising,
a compressor configured to compress ambient air and at least a portion of an exhaust gas recirculated from a turbine to form a compressed low-oxygen air stream;

a combustor configured to receive the compressed low-oxygen air stream from the compressor and to combust the syngas fuel in a rich-quench-lean (RQL) mode of combustion to generate an exhaust gas, wherein the combustor comprises:
  a rich zone configured to allow fuel-rich combustion of the fuel stream;
  a quench zone configured to allow conversion of the fuel-rich combustion to a fuel-lean combustion of the fuel stream; and
  a lean zone configured to allow the fuel-lean combustion of the fuel stream;
the turbine for receiving the exhaust gas from the combustor to generate electricity and a low-NOx exhaust gas;
wherein a first portion of the turbine exhaust gas is recirculated to the compressor to form the low-oxygen air stream;
a heat recovery steam generator (HRSG) configured to receive the exhaust gas from the turbine for generation of steam; and
an exhaust gas recirculation (EGR) control valve positioned directly downstream of the HRSG, and configured to solely control a flow of the first portion of exhaust gas from the heat recovery steam generator to the compressor,
wherein a second portion of the exhaust gas from the heat recovery steam generator is directed to a carbon dioxide capture system to capture carbon dioxide from the turbine exhaust gas prior to recirculation of the first portion of turbine exhaust gas to the compressor via the EGR control valve.

16. The IGCC system of claim 15, wherein the low-oxygen stream has less than 12% by volume of oxygen.

17. The IGCC system of claim 15, wherein the low-$NO_x$ exhaust gas has a $NO_x$ level of less than 30 ppm.

18. A turbine system, comprising:
  a compressor configured to compress ambient air and at least a portion of an exhaust gas recirculated from a turbine to form a compressed low-oxygen air stream;
  a Dry Low Emission (DLE) combustor configured to receive the compressed low-oxygen air stream from the compressor, and to combust a fuel stream in a rich-quench-lean (RQL) mode of combustion to generate the exhaust gas, wherein the combustor comprises:
    a rich zone configured to allow fuel-rich combustion of the fuel stream;
    a quench zone configured to allow conversion of the fuel-rich combustion to a fuel-lean combustion of the fuel stream; and
    a lean zone configured to allow the fuel-lean combustion of the fuel stream;
  the turbine for receiving the exhaust gas from the combustor to generate electricity and a low-$NO_x$, exhaust gas;
  wherein a first portion of the exhaust gas is recirculated to the compressor to form the low-oxygen air stream;
  a heat recovery steam generator (HRSG) configured to receive the exhaust gas from the turbine for generation of steam; and
  an exhaust gas recirculation (EGR) control valve positioned directly downstream of the HRSG, and configured to solely control a flow of the first portion of turbine exhaust gas from the HRSG to the compressor subsequent to carbon dioxide capture via a carbon dioxide capture system.

* * * * *